(12) United States Patent  Palmer

(10) Patent No.: US 11,189,398 B2
(45) Date of Patent: Nov. 30, 2021

(54) SUPERCONDUCTING ELECTRICAL POWER DISTRIBUTION SYSTEM

(71) Applicant: ROLLS-ROYCE plc, London (GB)

(72) Inventor: Chloe J. Palmer, Derby (GB)

(73) Assignee: Rolls-Royce PLC, London (GB)

( * ) Notice: Subject to any disclaimer, the term of this patent is extended or adjusted under 35 U.S.C. 154(b) by 68 days.

(21) Appl. No.: 16/734,491

(22) Filed: Jan. 6, 2020

(65) Prior Publication Data

US 2020/0244130 A1    Jul. 30, 2020

(30) Foreign Application Priority Data

Jan. 25, 2019    (GB) ..................................... 1901032

(51) Int. Cl.
| | |
|---|---|
| *H01B 12/00* | (2006.01) |
| *H01B 12/16* | (2006.01) |
| *H01B 12/02* | (2006.01) |
| *H02K 3/50* | (2006.01) |
| *H02K 9/20* | (2006.01) |

(Continued)

(52) U.S. Cl.
CPC ............. *H01B 12/16* (2013.01); *H01B 12/02* (2013.01); *H02K 3/50* (2013.01); *H02K 9/20* (2013.01); *H02K 11/046* (2013.01); *H02K 55/04* (2013.01); *H02K 2203/09* (2013.01); *H02K 2203/15* (2013.01)

(58) Field of Classification Search
CPC . H01B 12/02; H02K 3/50; H02K 9/20; H02K 11/046; H02K 55/04; H02K 2203/09; H02K 2203/15
See application file for complete search history.

(56) References Cited

U.S. PATENT DOCUMENTS

| | | |
|---|---|---|
| 3,946,141 A | 3/1976 | Schmidt |
| 3,950,606 A | 4/1976 | Schmidt |

(Continued)

FOREIGN PATENT DOCUMENTS

| | | |
|---|---|---|
| CA | 1016616 | 8/1977 |
| CN | 1161267 | 10/1997 |

(Continued)

OTHER PUBLICATIONS

Extended European Search Report from counterpart EP Application No. 20150774.6 dated Jun. 9, 2020, filed Jan. 5, 2021, 36 pgs.

(Continued)

*Primary Examiner* — Pete T Lee
(74) *Attorney, Agent, or Firm* — Shumaker & Sieffert, P.A.

(57) ABSTRACT

A superconducting electrical power distribution system has a superconducting bus bar and one or more bus bar thermal conductor lines extending in thermal proximity along the bus bar to receive heat from the bus bar over the length of the bus bar. The system further has superconducting cables electrically connected to the bus bar at respective electrical joints distributed along the bus bar. The system further has a cryogenic cooling sub-system. The system further has a network comprising first and second thermal conductor lines, each line comprising a cold end which is cooled by the cryogenic cooling sub-system, and an opposite hot end, whereby heat received by each line is normally conducted along the line in a direction from its hot end to its cold end.

9 Claims, 5 Drawing Sheets

(51) Int. Cl.
*H02K 11/04* (2016.01)
*H02K 55/04* (2006.01)

(56) References Cited

U.S. PATENT DOCUMENTS

| | | | |
|---|---|---|---|
| 4,845,308 A | | 7/1989 | Womack, Jr. et al. |
| 4,992,623 A | * | 2/1991 | Briley ............... H02G 5/10 |
| | | | 505/220 |
| 6,342,673 B1 | * | 1/2002 | Verhaege ............ H02G 15/34 |
| | | | 174/15.5 |
| 6,472,791 B1 | * | 10/2002 | Rehder ............... H01F 38/18 |
| | | | 310/129 |
| 6,864,417 B2 | | 3/2005 | Bechis et al. |
| 8,280,467 B2 | | 10/2012 | Yuan et al. |
| 8,896,312 B2 | | 11/2014 | Stauffenegger et al. |
| 9,378,870 B2 | | 6/2016 | Lakrimi et al. |
| 10,485,145 B2 | * | 11/2019 | Cullen ............... H05K 7/20927 |
| 2006/0040584 A1 | | 2/2006 | Ray et al. |
| 2006/0116292 A1 | * | 6/2006 | Kato ................. H01L 39/248 |
| | | | 505/230 |
| 2006/0283620 A1 | | 12/2006 | Maguire et al. |
| 2008/0190637 A1 | * | 8/2008 | Folts ................ H01L 39/16 |
| | | | 174/15.6 |
| 2012/0186854 A1 | | 7/2012 | Choi et al. |
| 2013/0090245 A1 | | 4/2013 | Simpkins |
| 2016/0003341 A1 | | 1/2016 | Sieveking et al. |
| 2016/0049225 A1 | | 2/2016 | McIntyre et al. |
| 2018/0169819 A1 | | 6/2018 | Junker |
| 2020/0243225 A1 | | 7/2020 | Palmer |

FOREIGN PATENT DOCUMENTS

| | | |
|---|---|---|
| CN | 107470871 | 12/2017 |
| EP | 0395314 | 10/1990 |
| WO | 2008051234 | 5/2008 |
| WO | 200811336 | 9/2008 |
| WO | 2008113366 A2 | 9/2008 |

OTHER PUBLICATIONS

Great Britain search report dated Jul. 3, 2019, issued in GB Patent Application No. 1901030.5.
Great Britain search report dated Jun. 26, 2019, issued in GB Patent Application No. 1901032.1.
European search report dated May 29, 2020, issued in EP Patent Application No. 20150774.
European search report dated Apr. 23, 2020, issued in EP Patent Application No. 19205047.
European search report dated May 29, 2020, issued in EP patent application No. 20150771.

* cited by examiner

SUPERCONDUCTING ELECTRICAL POWER DISTRIBUTION SYSTEM

CROSS-REFERENCE TO RELATED APPLICATIONS

This specification is based upon and claims the benefit of priority from UK Patent Application Number 1901032.1 filed on 25 Jan. 2019, the entire contents of which are incorporated herein by reference.

BACKGROUND

Technical Field

The present disclosure relates to a superconducting electrical power distribution system.

Description of the Related Art

The use of electrical machines for aerospace propulsion is known. However, conventional electrical machines generally have insufficient specific torque and power densities (whether measured in terms of weight or volume) to make the concept viable compared to conventional aerospace propulsion technologies for large aircraft.

Superconducting electrical machines have the potential for making substantial gains in specific torque and power densities. An attraction of using superconducting technology in electrical motors and generators is that they can operate at higher magnetic fields and currents than are possible in conventional electrical machines. This means that significantly more torque and power can be produced for a given machine volume, increasing the torque and power volume densities to levels that are needed for electrical propulsion in large aircraft applications. The near-zero electrical resistances also cause very low losses. This is also an advantage in power distribution systems or networks used to transfer electrical power between machines (e.g. between generators and motors).

However, the cryogenic cooling systems needed to maintain superconductivity within machines and across power distribution systems are energy intensive, complex and incur a significant weight penalty. They are a significant factor in restricting more widespread adoption of superconducting technology. Network cooling, in particular, can be problematic because of heat production at electrical connections between superconductors or between a superconductor and a non-superconductor. Cryogenic fluid boil-off in remote or difficult areas can also be a problem.

Conduction cooling is an alternative option for maintaining superconductivity which avoids some of these problems of cryogenic fluid-based convection cooling. For example, conduction cooling has been employed to satisfy the cooling requirement in superconducting electro magnets, such as those used in magnetic resonance imaging (MRI) and nuclear magnetic resonance (NMR) machines. In these machines, thermal conductors provide direct thermal connections between a cryogenic fluid and the electro magnets and/or their corresponding superconducting joints. However, it is more of a challenge to employ conduction cooling in a superconducting electrical power distribution system. In particular, conduction cooling can fail should a sudden surge in temperature occur at a location in a superconducting cable (known as a quench or a quench event). The heat from the quench event transfers to a local thermal conductor, and this heat transfer can reduce or even reverse the normal thermal gradient on the conductor, sending heat in the wrong direction and potentially impacting cooling performance in other parts of the system.

The present disclosure addresses such problems.

SUMMARY

According to a first aspect there is provided a superconducting electrical power distribution system comprising:
a superconducting bus bar;
one or more bus bar thermal conductor lines extending in thermal proximity along the bus bar to receive heat from the bus bar over the length of the bus bar;
superconducting cables electrically connected to the bus bar at respective electrical joints distributed along the bus bar;
a cryogenic cooling sub-system; and
a network comprising first and second thermal conductor lines, each line comprising a cold end which is cooled by the cryogenic cooling sub-system, and an opposite hot end, whereby heat received by each line is normally conducted along the line in a direction from its hot end to its cold end; wherein,
each first thermal conductor line extends in thermal proximity along a respective one of the superconducting cables to connect at its hot end to the one or more bus bar thermal conductor lines adjacent the electrical joint of its respective superconducting cable, each first thermal conductor line thereby receiving heat from and cooling its respective superconducting cable over the length of the superconducting cable; and,
the second thermal conductor lines connect at their hot ends to the one or more bus bar thermal conductor lines adjacent respective of the electrical joints, each second thermal conductor line being otherwise thermally insulated from the superconducting cables; whereby,
during a quench event at a location along one of the superconducting cables leading to local heating thereof, the or each second thermal conductor line connected at its hot end to the one or more bus bar thermal conductor lines adjacent the electrical joint of the quenched superconducting cable withdraws heat from the quenched superconductor cable via the hot end of the or each first thermal conductor line of the quenched superconducting cable, the withdrawn heat flowing in a reverse direction along the or each first thermal conductor line of the quenched superconducting cable between the location of the quench event and its hot end.

Advantageously, the second thermal conductor lines may serve as precautionary reserve cooling paths for withdrawing heat from the first thermal conductor lines in the event of a quench or other sudden heating event. Without this precaution there may be a risk that a quench in one of the superconducting cables could cause a temperature rise in the cable's electrical joint to the bus bar that would be significant enough to precipitate a further quench event at the joint or elsewhere along the bus bar. Such a further quench event could have serious implications for the proper functioning of the entire power distribution system.

In normal use, the cold ends are the coldest points along the thermal conductor lines. The temperature difference between the cold end and a given location along the thermal conductor lines drives the heat towards the cold end, and therefore heat received by each line may normally be conducted along the line in a direction from its hot end to its cold end. The terms "normal" and "normally" may thus refer to an operating condition of the system in which there is no quench event to disturb heat flow in any of the thermal conductor lines.

Optional features of the superconducting electrical power distribution system will now be set out. These are applicable singly or in any combination.

The thermal conductor lines may be in the form of thermally conductive strips or cables. The cold ends of the lines may be thermally connected to a heat sink(s) or a heat exchanger(s) of the cryogenic cooling sub-system.

Plural first thermal conductor lines may extend along each superconducting cable. In the event of a failure in one of these first thermal conductor lines (e.g. at its connection with the one or more bus bar thermal conductor lines), such an arrangement may help to ensure that enough heat from the respective superconducting cable may be conducted through the other first thermal conductor lines to maintain the cable at an adequately low temperature. That is, the plural first thermal conductor lines provide redundancy in case of failure in any one of them.

However, other parts of the network may have similar redundancy. For example, plural second thermal conductor lines may be connected to the one or more bus bar thermal conductor lines adjacent each of the electrical joints.

Each superconducting cable and its first thermal conductor line(s) may be sheathed in thermal insulation to thermally insulate the second thermal conductor lines from the superconducting cables.

The cross sectional areas of the thermal conductor lines may be sized according to their respective cooling loads, i.e. their required cooling capacity. More specifically, assuming the same material comprising the same thermal conductivity is used to form all the thermal conductor lines, thermal conductor lines that service higher cooling loads typically have greater cross-sectional areas than ones that service lower cooling loads. Such an arrangement reduces weight and allows a more optimal use of material to form the thermal conductor lines.

The cross sectional areas of the second thermal conductor lines may each be sized to accommodate at least a normal cooling load when there are no quench events along any of the superconducting cables plus an additional cooling load caused by a quench event at a location along the adjacent superconducting cable. This allows the second thermal conductor lines to adequately perform their precautionary reserve function in case of a quench event.

Accordingly, the combined cross sectional areas of the second thermal conductor lines which connect at their hot ends to the one or more bus bar thermal conductor lines adjacent any given one of the electrical joints may be sized to be larger than the combined cross sectional areas of the first thermal conductor lines which also connect at their hot ends to the one or more bus bar thermal conductor lines adjacent that electrical joint.

The bus bar and the bus bar thermal conductor lines may be sheathed in thermal insulation which may be penetrated by the superconducting cables and the first and second thermal conductor lines.

The superconducting electrical power distribution network may further comprise: (i) one or more superconducting electrical power generators, the or each power generator providing electrical power to the bus bar via a respective one of the cables; and/or (ii) one or more superconducting electrical motors, the or each motor receiving electrical power from the bus bar via a respective one of the cables. The network may then further comprise third thermal conductor lines each comprising a cold end which may be cooled by the cryogenic cooling sub-system, and an opposite hot end; wherein the third thermal conductor lines connect at their hot ends to (i) the power generators and/or (ii) the motors.

For example, the power generators may be AC power generators and the bus bar and cables may carry DC electrical power. In this case, between the or each power generator and the cable via which its electrical power may be provided to the bus bar, the power distribution system may further comprise a respective semiconductor-based rectifier which rectifies the AC electrical power generated by the power generator into DC electrical power; and the network may further comprise fourth thermal conductor lines each comprising a cold end which may be cooled by the cryogenic cooling sub-system, and an opposite hot end; and the fourth thermal conductor lines may connect at their hot ends to the semiconductor-based rectifiers.

The thermal conductor lines are formed of a material comprising a thermal conductivity of at least 100 W·m$^{-1}$K$^{-1}$ under cryogenic conditions. The thermal conductor lines may be formed of copper, or other highly thermally conductive material/arrangement such as gold, carbon nanotubes, graphene, graphene-doped composite, low pressure gas conduction tubes etc.

The skilled person will appreciate that, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
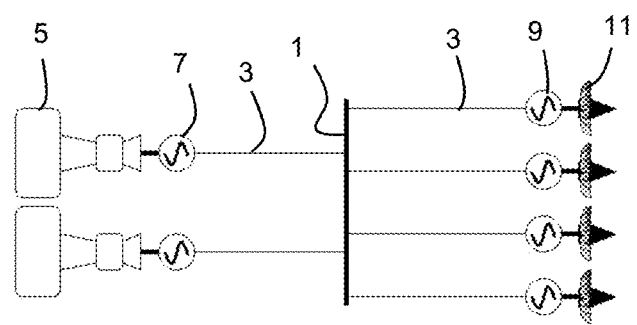
FIG. 1 shows schematically an AC superconducting electrical power distribution system.

FIG. 1 shows schematically an AC superconducting electrical power distribution system, e.g. for an aero-propulsion system. The system has a superconducting bus bar 1 and superconducting cables 3 which are electrically connected to the bus bar at respective joints distributed along the bus bar. Gas turbine engines 5 power respective superconducting AC power generators 7 which feed AC electrical power to the bus bar via respective ones of the cables. On the other side of the bus bar, superconducting electrical motors 9 draw AC electrical power from respective others of the cables and to power propulsive fans or propellers 11.

Figure 2:
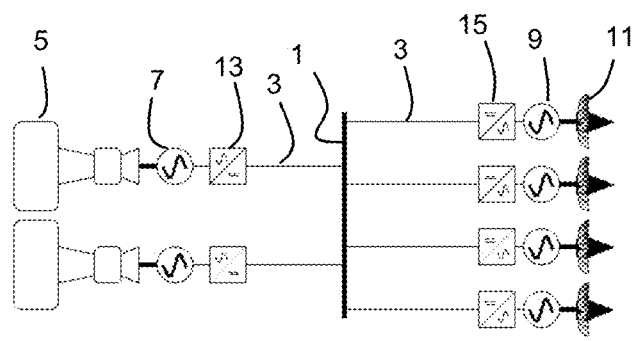
FIG. 2 shows schematically a DC superconducting electrical power distribution system.

FIG. 2 shows schematically a DC superconducting electrical power distribution system which is essentially identical to the AC system except for: semiconductor-based rectifiers 13 between the power generators 7 and their cables 3 which rectify the AC electrical power generated by the power generators into DC electrical power, and semiconductor-based inverters 15 between the electrical motors 9 and their cables 3 which invert the DC electrical power received from the bus bar 1 into AC electrical power.

Each component of the systems has different cooling requirements. The power generators 7 and electrical motors 9 require relatively low temperatures due to their high cooling loads. The bus bar 1 and cables 3 are less susceptible to sudden quench (due to higher thermal inertia-to-power density ratios) and consequently have less demanding cooling requirements.

Figure 3:
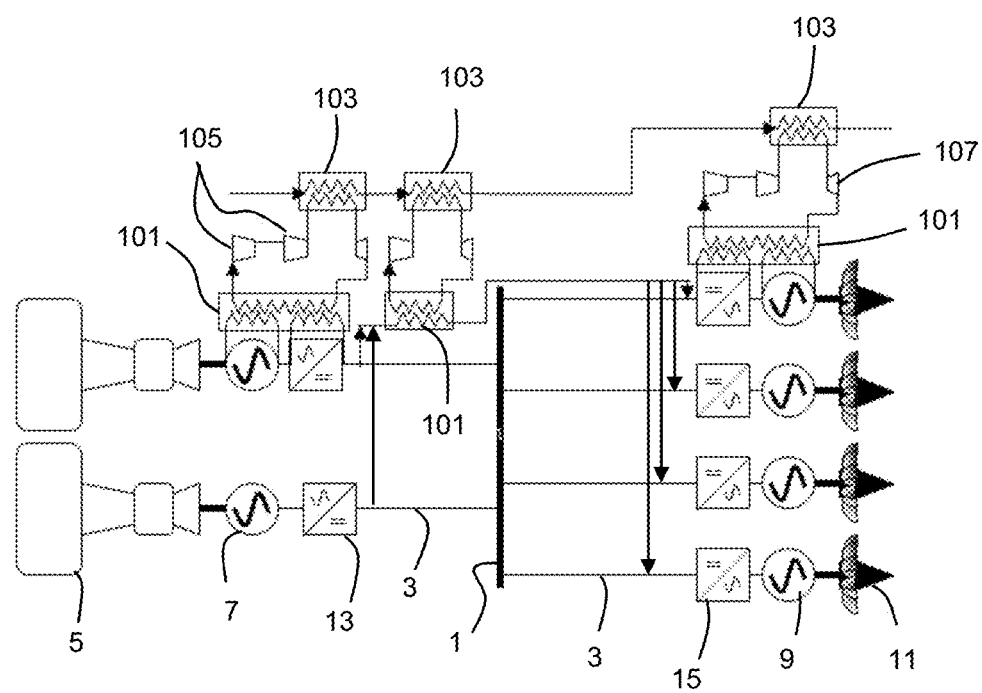
FIG. 3 shows the DC network of FIG. 2 comprising a cooling arrangement which is the result of applying conventional cryogenic cooling design practice.

FIG. 3 shows a cooling arrangement which is the result of applying conventional cryogenic cooling design practice to the network of FIG. 2. A similar cooling arrangement can be applied to the system of FIG. 1. A first coolant sub-system comprises first circuits which circulate, for example, helium coolant around the superconducting power generators 7, electrical motors 9, bus bar 1 and cables 3 and around the semiconductor power electronics 13, 15. In particular, the first circuits serving the bus bar and cables can include flow paths in the form of longitudinal channels (e.g. tubular jackets) along the bus bar and cables so that coolant enters the flow paths e.g. adjacent the inverters 15 and leaves adjacent the rectifiers 13. Arrowed lines indicate this direction of coolant flow around the first circuits serving the bus bar and cables.

The first coolant system also comprises first heat exchangers 101 which effect heat transfer from the helium coolant of the first circuits into a coolant of a second coolant system. In particular, the first circuits include outflow lines which transport the helium coolant from the components of the system to the heat exchangers, and inflow lines which return the re-cooled helium from the heat exchangers back to the components. The second coolant may also be helium. This is circulated by second circuits of the second coolant sub-system around second heat exchangers 103 which effect heat transfer from the second coolant into a third coolant, such as liquefied natural gas (LNG). Conveniently, the second cooling circuits can include compressors 105 en route to the second heat exchangers and expanders 107 en route away from the second heat exchangers.

As shown in FIG. 3, a single first heat exchanger 101 serves the first circuit which circulates coolant around the bus bar 1 and cables 3. As also shown, a single first heat exchanger serves the first circuit for one pair of a power generator 7 and a rectifier 13, and another first heat exchanger serves the first circuit for one pair of a motor 9 and an inverter 15. Although not shown, further first heat exchangers serve first circuits for other such pairs.

A problem with this cooling arrangement is that it requires a relatively large number of heat exchangers. This results from the focus of conventional cryogenic cooling subsystem design practice on individual components, which in turn leads to a failure to determine and prioritise cooling requirements at a system level. Thus conventional practice does not take into consideration relative operational temperatures of each component, e.g. that a higher temperature may be acceptable for cables than for motors, or likelihoods of local heating and quench. In particular, conventional practice can fail to recognise the significance of heat generation at the joints between components where at least one of those components is superconducting. In particular, the joints spaced along the bus bar 1 which electrically connect the bus bar to the cables 3 can generate significant heat and hence may require additional cooling.

Thus the present disclosure proposes a conductive cryogenic cooling methodology that can lead to more optimum and reliable cooling. The cooling capacity of a thermal conductor line, i.e. the rate at which heat can be conducted away from a target cooling site by the line, depends upon its thermal conductivity, its cross-sectional area, as well as the temperature gradient along the line. Thus the configuration of the thermal conductor lines and their thermal management are important for achieving light and efficient conductive cooling sub-systems.

Figure 4:
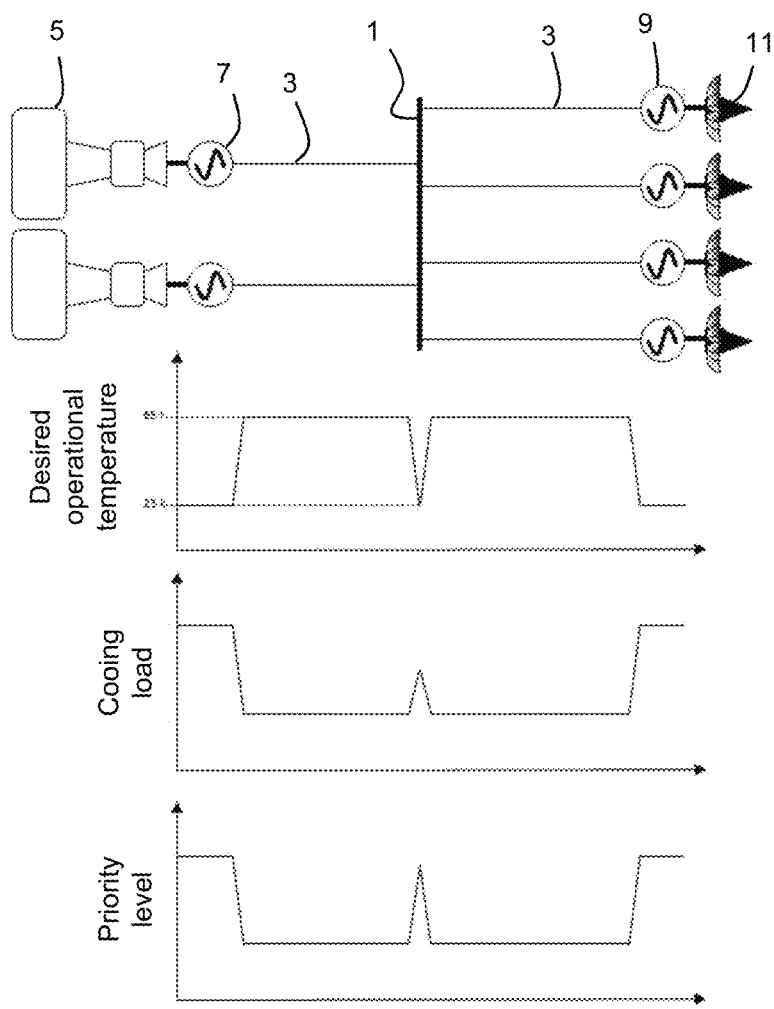
FIG. 4 shows at top the AC network of FIG. 1 and below schematic graphs of respectively desired operational temperature, cooling load and cooling priority level for the components of the system.

FIG. 4 shows at top the AC system of FIG. 1 and below schematic graphs of respectively desired operational temperature, cooling load (i.e. amount of heat rejected), and a resultant cooling priority level determined by dividing the cooling load by the desired temperature. The horizontal axis of each graph is location in the system, mapping onto the components of the system shown at top. Thus the power generators 7 and electrical motors 9 have relatively low operational temperatures and high cooling loads leading to high priority levels for these components. In contrast, the cables 3 are more efficient and are less susceptible to sudden quench, which is reflected in relatively high operational temperatures and low cooling loads leading to lower priority levels. However, the bus bar 1 also has a relatively low operational temperature and high cooling load leading to a high priority level because of the effect of heat generation at the joints with the cables.

Figure 5:
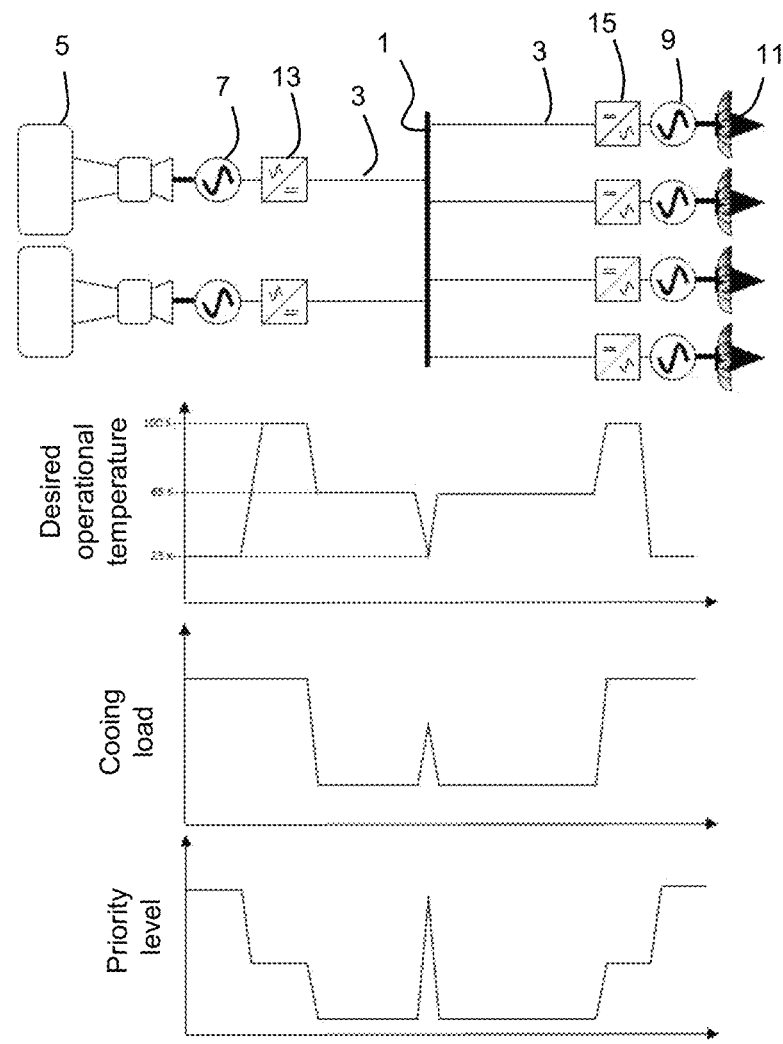
FIG. 5 shows at top the DC network of FIG. 2 and below schematic graphs of respectively desired operational temperature, cooling load and cooling priority level for the components of the system.

FIG. 5 shows the corresponding schematic graphs for the DC system of FIG. 2. The rectifier 13 and inverter 15 semiconductor power electronics operate at higher temperatures than the superconducting components of the network, but have similar cooling loads to the generators and motors, giving them a mid-level priority.

In the present disclosure, a superconducting electrical power distribution system of the type shown in FIGS. 1 and 2 has one or more bus bar thermal conductor lines for receiving heat from the bus bar 1 and a network of further thermal conductor lines for cooling the bus bar and other components of the power distribution system. These thermal conductor lines are formed of thermal conducting material comprising a thermal conductivity of at least $100 \, W \cdot m^{-1} K^{-1}$ under cryogenic conditions, for example copper in the form of strips.

In more detail, the one or more bus bar thermal conductor lines extend in thermal proximity along the bus bar 1 to receive heat from it over its length and conduct that heat to the network of further thermal conductor lines. A part of this network provides each superconducting cable 3 with one or more first thermal conductor lines which extend in thermal proximity along the cable to receive heat from and cool it over its length.

Figure 6A:
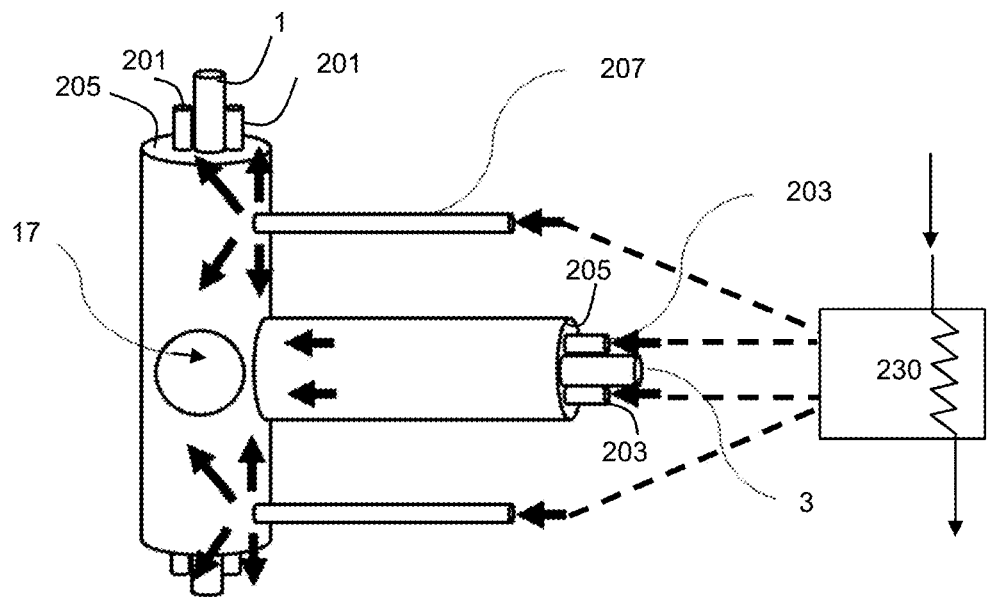
FIG. 6A shows schematically an electrical joint where cooling flow paths for a bus bar and a cable meet at an electrical connection joint between the bus bar and the cable during normal operation.

FIG. 6A shows schematically an electrical joint 17 between the bus bar 1 and one of the superconducting cables 3. The bus bar 1 and its thermal conductor lines 201 are sheathed in thermal insulation 205. Likewise, the superconducting cable 3 and its first thermal conductor lines 203 are sheathed in thermal insulation 205. At the joint 17, the superconducting cable 3 and the first thermal conductor lines 203 penetrate the bus bar thermal insulation to allow the cable to make electrical connection to the bus bar, and the first thermal conductor lines 203 to make thermal connection to the bus bar thermal conductor lines 201 adjacent the electrical connection. These ends of the first thermal conductor lines 203 are their hot ends, in the sense that heat flow along each line in normal operation is from its hot end to an opposite cold end, where the line releases its conducted heat to a cryogenic cooling sub-system 230. Conceptually, however, it can be helpful to think of cooling flow rather than heat flow, and accordingly in FIG. 6A cooling flows are indicated by block arrows. The actual heat flow at any of these arrows is in the opposite direction.

The cryogenic cooling sub-system 230 may comprise one or more heat exchangers (as indicated schematically in FIG. 6A) cooled by a cryogenic coolant, such as helium or hydrogen, circulating in a cooling circuit. The cooling circuit may be cooled by a further coolant, such as LNG, circulating in further cooling circuit.

The network of further thermal conductor lines includes second thermal conductor lines 207. These also penetrate the sheathing around the bus bar 1 to connect at their hot ends to the one or more bus bar thermal conductor lines 201 adjacent respective of the electrical joints 17 (two such lines being shown for the joint 17 of FIG. 6A). The opposite cold ends of the second thermal conductor lines 207 send heat conducted by the lines to the cryogenic cooling sub-system 230. Thus while the second thermal conductor lines 207 thermally communicate with the first thermal conductor lines 203 via their connections to the bus bar thermal conductor lines 201, they are otherwise thermally isolated from the first thermal conductor lines 203 (and indeed the superconducting cables 3) by the thermal insulation 205 sheathing the superconducting cables 3 and their first thermal conductor lines 203.

In normal operation, the first thermal conductor lines 203 thus provide cooling primarily for their respective cables 3 including the electrical joints between these cables 3 and the bus bar 1, while the second thermal conductor lines 207 provide cooling primarily for the bus bar 1, and to a lesser extent these electrical joints. This arrangement allows the power distribution system to attain the desired operational temperatures for the bus bar 1 and cables 3 shown schematically in FIGS. 4 and 5.

Figure 6B:
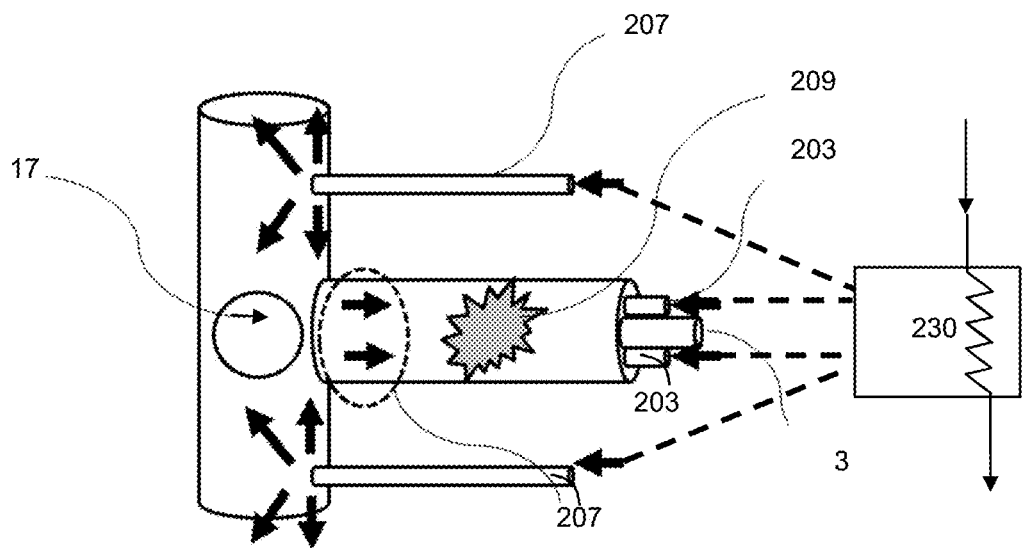
FIG. 6B shows the cooling flow paths across the electrical joint of FIG. 6A during a quench event in the cable.

FIG. 6B then shows schematically the effect on the system of a quench event 209 in one of the cables 3. Local heating, or sudden surge in cooling requirement, occurs at the location of the quench event 209 and hence in the adjacent first thermal conductor lines 203. This heating can reverse the normal thermal gradient in the first thermal conductor lines 203, and particularly if the quench event occurs at or close to the electrical joint 17, can therefore send heat into the bus bar 1, with potentially serious consequences for the proper operation of the system.

However, advantageously, the second thermal conductor lines 207 provide a cooling path to evacuate this heat. In particular, the thermal gradient along the second thermal conductor lines 207 is not reversed by the quench event, and thus the second thermal conductor lines continuously operate to withdraw heat from the joint 17. By appropriately sizing and/or providing a suitable number of the second thermal conductor lines 207 so that they can perform this function as well as their normal primary operating function of cooling the bus bar, it is possible to protect the bus bar 1 from the risks associated with such quench events. Typically, the combined cross sectional area of the second thermal conductor lines 207 for any given joint 17 is greater than that of the first thermal conductor lines 203 for that joint.

In summary, the network of first 203 and second 207 thermal conductor lines improves the robustness of the system to quench events by significantly reducing the time needed to evacuate heat after such an event.

Preferably, each cable 3 has plural of the first thermal conductor lines 203 and the bus bar has plural of its thermal conductor lines 201. Such arrangement can improve the overall thermal contact between the cable 3/bus bar 1 and its thermal conductor lines, as well as providing a redundancy should any one of the lines break or become otherwise unavailable to conduct heat.

Although not shown in FIGS. 6A and 6B, the network may comprise third thermal conductor lines to provide conductive cooling to, for example the power generators 7 and electrical motors 9 of the systems of FIGS. 1 and 2. In the case of the system of FIG. 2, the network may further comprise fourth thermal conductor lines for transferring heat from the semiconductor-based rectifiers 13. Like the second thermal conductor lines, these third and fourth thermal conductor lines comprise hot ends at their respective component and cold ends which transfer the conducted heat to cryogenic cooling sub-system 230. Such an arrangement allows the power distribution system to attain the desired operational temperatures for the power generators 7, electrical motors 9 and rectifiers 13 shown schematically in FIGS. 4 and 5.

Preferably, the cross sectional areas of all the thermal conductor lines are matched with the cooling loads of the respective components of the system, noting of course that the second thermal conductor lines 207 have the additional requirement to provide cooling paths to evacuate heat from the joints 17 on occurrence of a quench event in the cables 3. This helps reduce the overall weight of the thermal conductor lines in the system.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A superconducting electrical power distribution system comprising:
   a superconducting bus bar;
   one or more bus bar thermal conductor lines extending in thermal proximity along the bus bar to receive heat from the bus bar over the length of the bus bar;
   superconducting cables electrically connected to the bus bar at respective electrical joints distributed along the bus bar;
   a cryogenic cooling sub-system; and
   a network comprising first and second thermal conductor lines, each line comprising a cold end which is cooled by the cryogenic cooling sub-system, and an opposite hot end, whereby heat received by each line is normally conducted along the line in a direction from its hot end to its cold end; wherein
   each first thermal conductor line extends in thermal proximity along a respective one of the superconducting cables to connect at its hot end to the one or more bus bar thermal conductor lines adjacent the electrical joint of its respective superconducting cable, each first thermal conductor line thereby receiving heat from and cooling its respective superconducting cable over the length of the superconducting cable; and,
   the second thermal conductor lines connect at their hot ends to the one or more bus bar thermal conductor lines adjacent respective of the electrical joints, each second thermal conductor line being otherwise thermally insulated from the superconducting cables; whereby, during a quench event at a location along one of the superconducting cables leading to local heating thereof, each second thermal conductor line connected at its hot end to the one or more bus bar thermal conductor lines adjacent the electrical joint of the quenched superconducting cable withdraws heat from the quenched superconductor cable via the hot end of each first thermal conductor line of the quenched superconducting cable, the withdrawn heat flowing in a reverse direction along each first thermal conductor line of the quenched superconducting cable between the location of the quench event and its hot end.

2. The superconducting electrical power distribution system as claimed in claim 1, wherein plural first thermal conductor lines extend along each superconducting cable.

3. The superconducting electrical power distribution system as claimed in claim 1, wherein each superconducting cable and its first thermal conductor line(s) are sheathed in thermal insulation to thermally insulate the second thermal conductor lines from the superconducting cables.

4. The superconducting electrical power distribution system as claimed in claim 1, wherein the cross sectional areas of the second thermal conductor lines are each sized to accommodate at least a normal cooling load when there are no quench events along any of the superconducting cables plus an additional cooling load caused by a quench event at a location along the adjacent superconducting cable.

5. The superconducting electrical power distribution system as claimed in claim 4, wherein the combined cross sectional areas of the second thermal conductor lines which connect at their hot ends to the one or more bus bar thermal conductor lines adjacent any given one of the electrical joints is sized to be larger than the combined cross sectional areas of the first thermal conductor lines which also connect at their hot ends to the one or more bus bar thermal conductor lines adjacent that electrical joint.

6. The superconducting electrical power distribution system as claimed in claim 1, wherein the bus bar and the one or more bus bar thermal conductor lines are sheathed in thermal insulation which is penetrated by the superconducting cables and the first and second thermal conductor lines.

7. The superconducting electrical power distribution system as claimed in any one of claim 1, further comprising:
(i) one or more superconducting electrical power generators, each power generator providing electrical power to the bus bar via a respective one of the cables; and/or
(ii) one or more superconducting electrical motors, each motor receiving electrical power from the bus bar via a respective one of the cables;
wherein the network further comprises third thermal conductor lines each comprising a cold end which is cooled by the cryogenic cooling sub-system, and an opposite hot end; and
wherein the third thermal conductor lines connect at their hot ends to (i) the power generators and/or (ii) the motors.

8. The superconducting electrical power distribution system as claimed in claim 7, further comprising (i) the power generators, wherein:
the power generators are AC power generators;
the bus bar and cables carry DC electrical power;
between each power generator and the cable via which its electrical power is provided to the bus bar, the power distribution system further has a respective semiconductor-based rectifier which rectifies the AC electrical power generated by the power generator into DC electrical power; and
the network further comprises fourth thermal conductor lines each comprising a cold end which is cooled by the cryogenic cooling sub-system, and an opposite hot end; and
wherein the fourth thermal conductor lines connect at their hot ends to the semiconductor-based rectifiers.

9. The superconducting electrical power distribution system as claimed in claim 1, wherein the thermal conductor lines are formed of a material comprising a thermal conductivity of at least 100 $W \cdot m^{-1} K^{-1}$ under cryogenic conditions.

* * * * *